ERWIN M. ROSCHKE
*INVENTOR.*
BY Francis W. Crotty
HIS ATTORNEY.

Dec. 21, 1954 E. M. ROSCHKE 2,697,741

SUBSCRIPTION TELEVISION SYSTEM

Filed April 29, 1953 3 Sheets-Sheet 2

ERWIN M. ROSCHKE
*INVENTOR.*

BY Francis W. Crotty

HIS ATTORNEY.

ERWIN M. ROSCHKE
INVENTOR.
BY Francis W. Crotty
HIS ATTORNEY.

United States Patent Office 2,697,741

Patented Dec. 21, 1954

2,697,741

SUBSCRIPTION TELEVISION SYSTEM

Erwin M. Roschke, Des Plaines, Ill., assignor to Zenith Radio Corporation, a corporation of Illinois Application April 29, 1953, Serial No. 351,936

6 Claims. (Cl. 178—5.1)

This invention relates to subscription television systems in which a television signal is transmitted in coded form to be utilized only in subscriber receivers equipped with decoding devices controlled in accordance with the coding schedule employed at the transmitter.

Subscription television systems have been proposed in which a television signal is coded with a very high degree of complexity by varying the mode of translation at a faster-than-field rate; that is, the television signal is coded by altering some characteristic thereof at intervals occurring more frequently than the field-scanning intervals. A system of this type is disclosed and claimed, for example, in copending application Serial No. 291,714, filed June 4, 1952, in the name of Carl G. Eilers et al., and assigned to the present assignee. In accordance with one embodiment of that copending application, a counting mechanism is actuated by line-synchronizing pulses to develop a square-wave coding signal having amplitude excursions each time the mechanism registers a predetermined count, for example, after every 15 line-trace intervals. This coding signal, in turn, actuates a coding device to effect mode changes in the television system as between two modes of operation at a rate corresponding to the coding signal frequency. Each mode preferably is established by introducing a different predetermined time relation between the video and synchronizing components of the television signal. Further secrecy is introduced by inverting the phase of the coding signal, preferably at random times, and indicating the timing schedule of such phase-reversals to subscriber receivers by means of a transmitted key signal. Such a coding technique results in an image pattern at an unauthorized receiver wherein the entire picture is broken up into sections or groups of 15 line traces each, and these groups individually and independently "jitter" back and forth between the two operating modes preferably in a very irregular fashion.

In copending application Serial No. 281,418, filed April 9, 1952, in the name of George V. Morris et al., and assigned to the present assignee, there is disclosed a television system which may be selectively established at any one of at least four operating modes, each of the modes also preferably introducing a different time relation between the video and synchronizing components of the television signal. This is accomplished by deriving a coding signal comprising a family of pulses and examining these pulses, so to speak, in each interval during which there is to be a determination of operating mode. For example, the presence of one pulse in the mode-determining interval may result in the establishment of one operating mode, a pair of pulses may denote a second mode, three pulses a third mode, and so forth. The coding technique of the Morris et al. application therefore produces a picture at an unauthorized receiver which "jitters" horizontally between at least four modes of operation.

While the patterns produced by the described systems of either one of the aforementioned applications may be greatly distorted, it may be desirable additionally to increase the coding complexity by further scrambling the picture at the unauthorized receivers. To this end, and in accordance with the present invention, a cycling mechanism is employed to actuate an encoding device, which may be similar to that described in the Morris et al. application, at a faster-than-field rate so that the scrambled picture resulting on the image-reproducing device at an unauthorized receiver is divided into segments, individually comprising a predetermined number of line traces, that appear in any one of at least four operating modes. In this way, a multi-mode repeating pattern occurring at a faster-than-field rate may be developed to thoroughly and completely distort the image at an unauthorized receiver.

For example, as in the embodiment presently to be described, the encoding device may be actuated by the cycling mechanism in such a manner that the successive segments of line traces on the picture tube of an unauthorized receiver assume successive ascending or descending "steps" of a mode-changing pattern of stair-step waveform; that is, if four operating modes are employed to introduce four different time relationships between the video and synchronizing components, an initial segment or group of line traces assumes a mode "*a*" which may denote no appreciable time delay between the video and synchronizing components, the second or succeeding group assumes an ascending "step" or mode "*b*" because of a definite predetermined time delay introduced, the third group assumes a further ascending "step" of mode "*c*," while the succeeding or fourth segment of line traces assumes the "top step" or mode "*d*" which introduces a maximum time delay between the video and synchronizing components. Upon reaching the "top" step, the cycling mechanism may cause the encoding device to return the system to mode "*a*" either directly or via one or more "steps" or still further by means of descending "steps" each corresponding to an ascending "step," as in the case of the illustrated embodiment to be described. Further secrecy may be obtained with this system by operating the encoding device at a given frequency at certain times thereby to include a predetermined number of line traces in each group or segment, and by operating the encoding device at another frequency at other times and indicating to the subscriber receivers the particular frequency which is to be utilized.

It is, accordingly, an object of the present invention to provide a new and improved subscription television system in which the television signal is coded with a high degree of complexity.

It is another object of the invention to provide an improved subscription television system in which the mode of the transmitted television signal is varied at a relatively high rate to render unauthorized decoding extremely difficult.

It is another object of the present invention to provide an improved subscription television system having at least four modes of operation and employing faster-than-field mode changing in a repetitive predetermined sequence to produce an image at an unauthorized receiver which exhibits an extremely high degree of unintelligibility.

A further object of the invention is to provide an improved encoding system for use at the transmitter and/or receiver of a subscription television system which may employ faster-than-field coding.

The encoding system of the present invention may be employed in either the transmitter or receiver portion of a television system which translates a television signal having video components included within a recurring series of line-trace intervals constituting successive image fields and further having intervening line-synchronizing components. The system comprises an encoding device having at least four operating conditions each of which establishes a different time relation between the video and synchronizing components of the television signal. It further includes a pulse-signal source for developing pulses recurring at a rate greater than the recurrence rate of the image fields and individually representing one of the line intervals. The encoding system has a pulse-actuated cycling mechanism having an input circuit coupled to the pulse-signal source and operates in response to the application of a predetermined number of pulses from the source for advancing from one to another of at least four operating steps in executing each cycle of operation. This cycling mechanism includes first counting means, second counting means, and third counting means for effecting actuation of the second counting means at a frequency less than and subharmonically related to the frequency of the first counting means. Finally, the encoding system comprises means for coupling the cycling mechanism to the encoding device to actuate the device from one to another of its operating conditions as the mechanism advances from one to another of its operating steps.

The features of this invention which are believed to be new are set forth with particularity in the appended claims. The invention, together with further objects and advantages thereof, may best be understood, however, by reference to the following description in conjunction with the accompanying drawings, in which:

Figure 1:
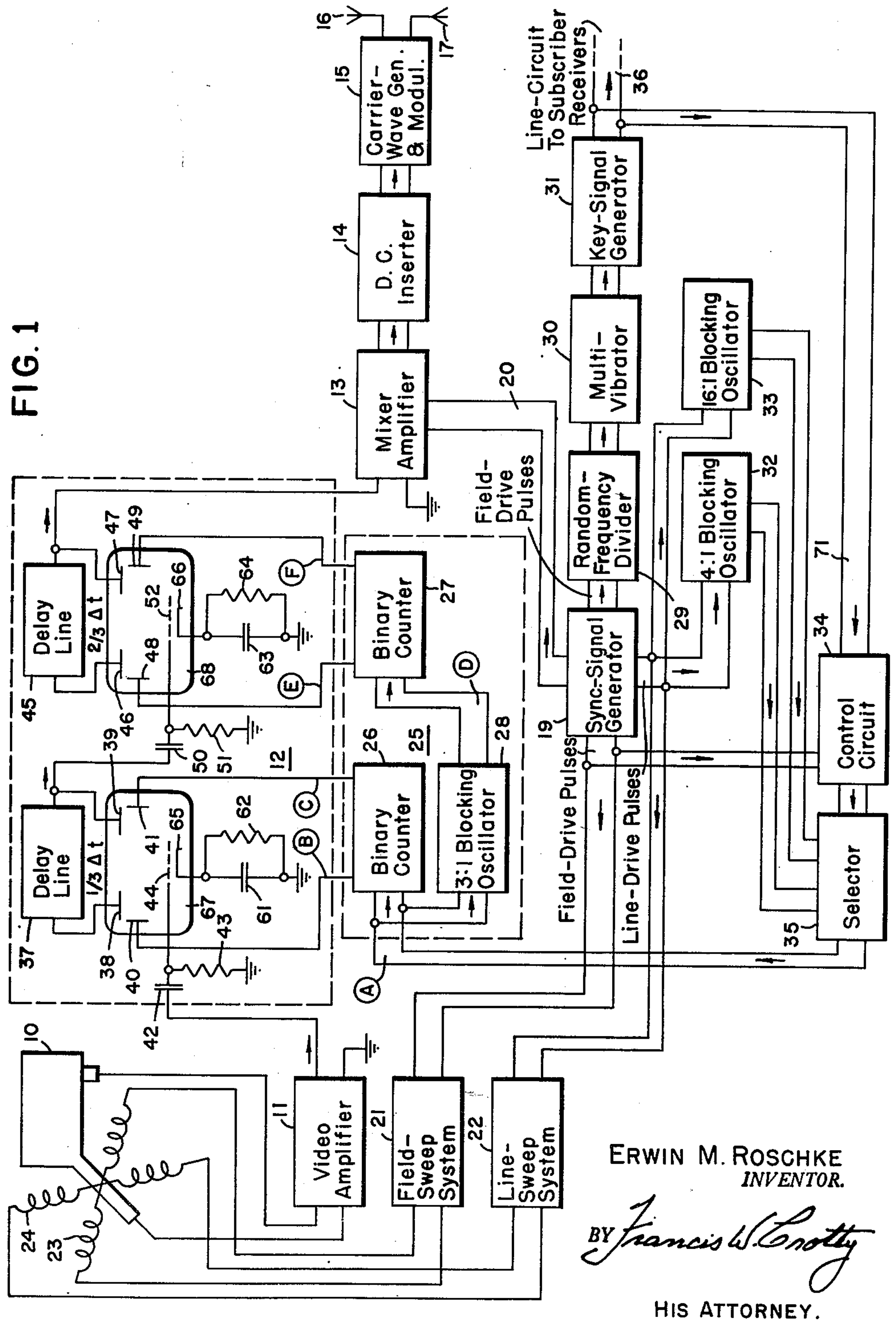
Figure 1 is a schematic representation of a subscription television transmitter constructed in accordance with the invention.

The transmitter of Figure 1 includes a picture-converting device 10 which may be an iconoscope, image orthicon or other known device for deriving a video signal representing an image to be televised. The output terminals of device 10 are connected to a video amplifier 11 which, in turn, is connected to the input circuit of an encoding device or coder 12. The construction of this encoding device is to be described in detail shortly but it is sufficient to state at this time that coder 12 functions to selectively introduce various delay lines into the video channel to establish any one of four different time relationships between the video and synchronizing components of the radiated television signal thereby to establish four correspondingly different operating modes in the television transmitter. Such intermittent variations in the relative timing of the video and synchronizing components effectively codes the television signal since conventional television receivers, not equipped with suitable decoding apparatus, depend upon an invariable time relation of the video and synchronizing components of a received signal to reproduce the image intelligence represented thereby. The output circuit of coder 12 is connected to a mixer amplifier 13 which, in turn, is connected through a direct-current inserter 14 to a carrier-wave generator and modulator 15. The output terminals of unit 15 are connected to an antenna 16, 17.

The transmitter also includes a synchronizing-signal generator 19 which supplies line- and field-synchronizing components and associated pedestal components to mixer amplifier 13 over conductors 20. Generator 19 further supplies field- and line-drive pulses to a field-sweep system 21 and to a line-sweep system 22, respectively. The output terminals of sweep systems 21 and 22 are connected to the field-deflection elements 23 and line-deflection elements 24, respectively, associated with picture-converting device 10.

Returning now to the construction of encoding device 12, this coder includes a pair of beam tubes 67 and 68 connected between video amplifier 11 and mixer amplifier 13. Beam tubes 67 and 68 may be constructed, for example, in the manner shown and described in the copending application of Robert Adler, Serial No. 243,039, filed August 22, 1951, for "Subscription Television System," and assigned to the present assignee. One of the output terminals of video amplifier 11 is connected to an intensity-control electrode 44 of beam tube 67 through a coupling condenser 42, the control electrode being connected to ground through a grid-leak resistor 43 and the other output terminal of the video amplifier being connected to ground directly. The cathode 65 of tube 67 is connected to ground through a cathode resistor 62 which is shunted by a condenser 61. Beam tube 67 has a pair of deflection-control elements 40 and 41 and a pair of target electrodes 38 and 39. Electrode 38 is connected to the input terminal of a delay line 37 and also to the positive terminal of a source of unidirectional potential (not shown), while target electrode 39 is connected to the output terminal of delay line 37 and also to the positive terminal of a source of unidirectional potential (not shown). Delay line 37 is so constructed that it imparts a time delay of $\frac{1}{3}\Delta t$ to a signal impressed on its input terminals, where $\Delta t$ may be considered the maximum time delay introduced into the video channel at any one time.

The output terminal of delay line 37 and target electrode 39 are coupled to an intensity-control electrode 52 of beam tube 68 by means of a condenser 50, the control electrode being connected to ground through a grid-leak resistor 51. The cathode 66 of tube 68 is connected to ground through a cathode resistor 64 which is shunted by a cathode by-pass condenser 63. Beam tube 68 has a pair of deflection-control elements 48 and 49 and a pair of target electrodes 46 and 47. Electrode 46 is connected to the input circuit of a delay line 45 and to the positive terminal of a source of unidirectional potential (not shown), while electrode 47 is connected to the output terminal of delay line 45, to the positive terminal of a source of unidirectional potential (not shown), and also to the input circuit of mixer amplifier 13. Delay line 45 is constructed to introduce a time delay of duration $\frac{2}{3}\Delta t$ to a signal impressed on its input terminals.

Considering now the operation of encoding device 12 without regard for the additional circuitry included in the transmitter, the video signal developed at the output terminals of amplifier 11 is applied to control electrode 44 of beam tube 67 and intensity-modulates the electron beam developed therein. The video-modulated electron beam is directed either to target electrode 38 or to target electrode 39 under the control of deflection elements 40, 41 which may receive a deflection signal in a manner to be described. During intervals when the beam is directed to target 38, the video signal is impressed on control electrode 52 of beam tube 68 through a path including delay line 37 and is delayed a selected amount (namely, $\frac{1}{3}\Delta t$) due to the inclusion of the delay line in the circuit. However, when the beam is directed to target electrode 39, the video signal is applied directly to control electrode 52 without appreciable delay. Likewise, the video-modulated electron beam in beam tube 68 is directed to target electrode 46 or to target electrode 47 under the control of deflection elements 48 and 49 which may receive a deflection signal in a manner to be described. When the electron beam is directed to target 46, the video signal is applied to mixer amplifier 13 over a path which includes delay line 45 and is delayed a selected amount (namely, $\frac{2}{3}\Delta t$) due to the delay line, but when the electron beam is directed to target electrode 47, delay line 45 is removed from the video channel and no appreciable delay is imparted to the video signal in its translation through beam tube 68 to mixer amplifier 13.

In any interval in which the electron beams in tubes 67 and 68 are directed respectively to targets 39 and 47, the video signal from amplifier 11 is supplied to mixer amplifier 13 with no appreciable time delay relative to the synchronizing components supplied to the mixer from generator 19, and the transmitter may be considered as operating in a normal mode or mode "*a*." When the electron beam in tube 67 is directed to target 38 and the beam in tube 68 is directed to target 47, delay line 37 is functionally interposed in the circuit, and the video signal is delayed (namely, $\frac{1}{3}\Delta t$) relative to the synchronizing components as determined by this delay line; in such an operating condition, the transmitter may be said to be operating in mode "*b*." When the beam in tube 67 is directed to target 39 and the beam in tube 68 is directed to target electrode 46, only delay line 45 is effective; the delay introduced by line 45 amounts to $\frac{2}{3}\Delta t$, and the transmitter may be considered as operating in mode "*c*." Finally, when the beam in tube 67 is directed to target electrode 38 and the beam in tube 68 is directed to target electrode 46, both delay lines 37 and 45 are effective and the delay of the video signal is determined by the total delay of the two lines, that is, $\frac{1}{3}\Delta t+\frac{2}{3}\Delta t$ or $\Delta t$ to establish mode "*d*" operation. Therefore, by selective application of deflection signals to deflection elements 40, 41 and to elements 48, 49 the operation of the transmitter may be switched between four modes, and variation of these deflection signals from time to time provides a highly complex coding schedule for the transmitted television signal.

The deflection of the electron beams in tubes 67 and 68 is controlled by a pulse-actuated cycling mechanism 25 which is responsive to the application of a predetermined number of pulses for executing a cycle of operations. Mechanism 25 may include a well-known binary counter 26 which is triggered from one to the other of two stable operating conditions in response to successive applied pulses. Counter 26 has one output terminal connected to deflection element 40 of beam tube 67 and another output terminal connected to deflection element 41.

The signals appearing at these two output terminals are 180° out of phase with respect to each other so that when the counter is in one operating condition the electron beam of tube 67 is incident upon target electrode 38 while the electron beam is directed to target 39 when the binary counter is in its other operating condition.

Pulse-actuated cycling mechanism 25 may also comprise a well-known 3:1 blocking oscillator 28 which is actuated by the same applied signal as binary counter 26. The blocking oscillator is, in turn, connected to the input terminals of a binary counter 27 which is preferably identical in construction to counter 26. The two output terminals of counter 27 are connected to respective deflection elements 48 and 49 so that the electron beam of tube 68 is incident on target electrode 46 when counter 27 is in one operating condition and on target electrode 47 when the counter is in its other operating condition. Because of the 3:1 frequency division of blocking oscillator 28, binary counter 27 operates at a frequency that is ⅓ the frequency of counter 26 regardless of the pulse-repetition frequency of the applied pulse signal.

A pulse-signal source is provided in the encoding system for supplying to cycling mechanism 25 a series of pulses individually representing one of the line intervals. More specifically, line-drive pulses are supplied to the input circuit of a 4:1 blocking oscillator 32 and also to the input circuit of a 16:1 blocking oscillator 33, each of these oscillators having its output circuit connected to respective input circuits of a selector 35, which may be an electronic switch of any suitable known construction. The output terminals of selector 35 are connected to the input terminals of binary counter 26 and also to the input terminals of 3:1 blocking oscillator 28. With this arrangement of the pulse-signal source, during certain predetermined time intervals cycling mechanism 25 is actuated at one frequency to effect a division of the line traces into groups of a given number and during other predetermined intervals the cycling mechanism is operated to cause a division into groups of a different number of line traces each.

In order to develop an actuating or selecting signal for selector 35, a random-frequency divider 29, which may be constructed as disclosed and claimed in Patent 2,588,413, issued March 11, 1952, in the name of Erwin M. Roschke and assigned to the present assignee, is connected to generator 19 to derive field-drive pulses therefrom. The output terminals of divider 29 are connected to an Eccles-Jordan multivibrator 30 which, in turn, is connected to a key-signal generator 31. The output terminals of the key-signal generator are connected to a line circuit 36 which extends to the various subscriber receivers (not shown) and by means of conductors 71 to a control circuit 34.

Control circuit 34, which is also supplied with field-drive pulses from synchronizing-signal generator 19, may be constructed as disclosed and claimed in copending application Serial No. 241,012, filed August 8, 1951, and issued March 23, 1954, as Patent 2,673,239, in the name of Carl G. Eilers, and assigned to the present assignee. This circuit may comprise a coincidence or phasing circuit for producing a square wave having amplitude excursions only during field-retrace intervals. The output terminals of control circuit 34 are connected to supply a suitable selecting signal to selector 35.

In considering the operation of the described transmitter, the technique of coding will be disregarded initially. Picture-converting device 10 produces video-frequency components representing the program information to be televised and these components, after amplification in amplifier 11, are supplied through coder 12 to mixer amplifier 13. The mixer also receives the usual line- and field-synchronizing and blanking pulses from generator 19 so that a composite television signal is developed therein. That signal is adjusted as to background level in direct-current inserter 14 and is amplitude modulated on a picture carrier in unit 15. The modulated video carrier is supplied to antenna 16, 17 for transmission to subscriber receivers. It will, of course, be understood that in the generation of the video-frequency components, sweep systems 21 and 22 are synchronized by the field- and line-drive pulses from generator 19. As in any television broadcast, the accompanying audio information is modulated on a sound carrier and concurrently radiated. However, the sound system may be entirely conventional and since it constitutes no part of the present invention, it has not been illustrated in order to avoid unnecessarily encumbering the drawing.

It is necessary in any commercial subscription system to code the video signal, and preferably the sound signal as well, to prevent pirating or unauthorized use of the program material. Briefly, coding of the video portion of the broadcast is accomplished by coder 12 under the influence of the deflection-control signals developed by pulse-actuated cycling mechanism 25 which switches the beams of tubes 67 and 68 back and forth between their associated target electrodes. As previously explained, this actuation of the encoding device varies the operating mode of the transmitter by modifying the time relation of the video and synchronizing components of the radiated signal and thus achieves one degree of coding. A second degree of coding is realized by varying the frequency of the pulse-actuating signal supplied to the cycling mechanism at predetermined time intervals and communicating the occurrence of such intervals to subscriber receivers by means of a transmitted key signal, as disclosed and claimed in copending application Serial No. 344,996, filed March 27, 1953, in the name of Carl G. Eilers et al. and assigned to the present assignee. Consideration will now be given to the particular manner in which the telecast is coded in accordance with the present invention.

Periodically recurring line-drive pulses are applied to blocking oscillators 32 and 33 to supply two pulse signals, individually having a distinct pulse-repetition frequency, to the input circuits of selector 35. That is, in the case of blocking oscillator 32 every 4th line-drive pulse is applied to the selector whereas in the case of blocking oscillator 33 every 16th line-drive pulse is impressed on selector 35. Of course, any suitable frequency division may be employed; the 4:1 and 16:1 ratios are shown only for illustrative purposes.

Meanwhile, field-drive pulses are supplied to random-frequency divider 29 which triggers multivibrator 30 at randomly selected field-retrace intervals. The multivibrator develops a square wave-signal, comprising pulse components initiated and terminated by successive output pulses from the random frequency divider, for application to key-signal generator 31. Generator 31 supplies a burst of key signal to line 36 and to control circuit 34 for the duration of each pulse component of a predetermined polarity. Circuit 34 operates under the conjoint control of field-drive pulses and the key signal to produce an actuating or selecting signal which varies only during randomly selected field-retrace intervals. The selector operates in response to this actuating signal and translates either one of the two pulse signals from blocking oscillators 32 and 33 to cycling mechanism 25 for effecting operation thereof in accordance with the pulse-repetition frequency of the selected signal. The selecting schedule represented by the actuating signal is communicated to authorized subscriber receivers by means of the key signal which is translated to such receivers over line circuit 36. It is, of course, evident that the utilization of a line circuit to convey coding information is immaterial to the inventive concept and that such information may be distributed in whole or in part in other manners, as for example in the form of auxiliary modulation of the sound carrier or video carrier.

The pulses applied to binary counter 26 and also to 3:1 blocking oscillator 28 may thus occur every 4th line-trace interval or every 16th line-trace interval depending on the instantaneous amplitude of the selecting signal. However, for purposes of explanation, the signal applied to cycling mechanism 25 is graphically represented in curve A of Figure 2 and may represent the output signal from either blocking oscillator 32 or 33, or for that matter it may represent any pulse signal having a desired repetition frequency.

Figure 2:
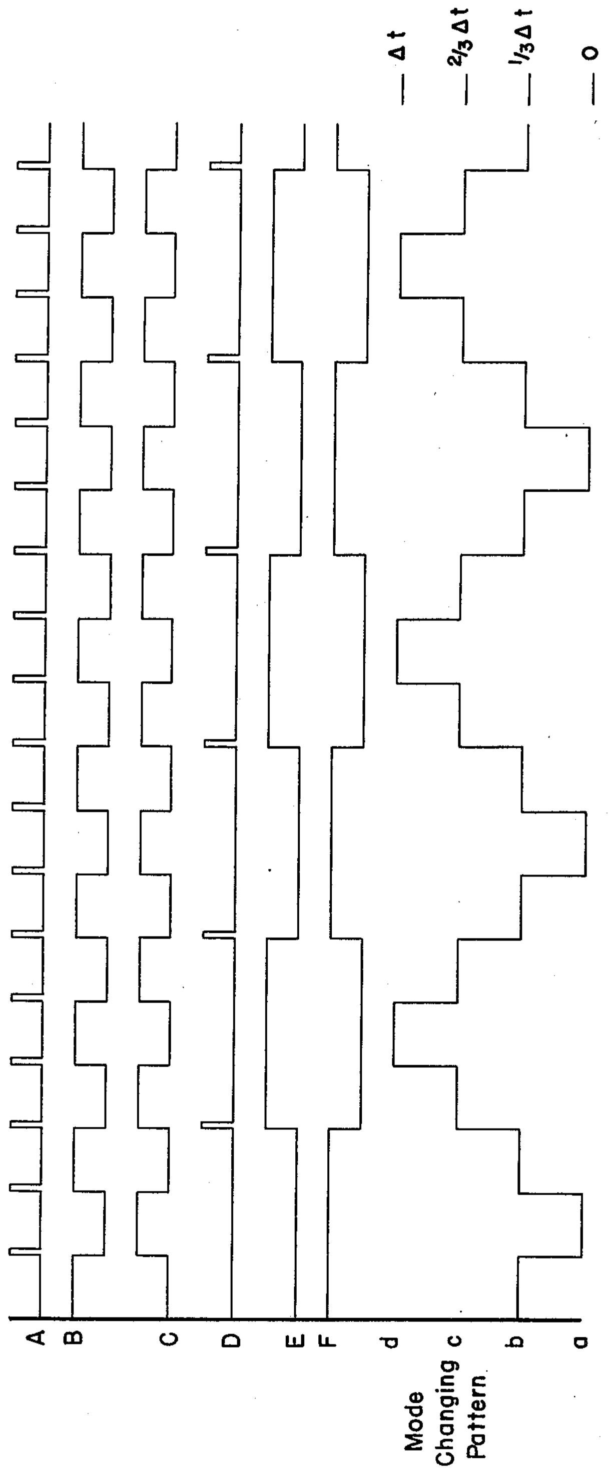
Figure 2 illustrates a family of curves plus a mode changing pattern related to these curves and is useful in explaining the operation of the system.

With reference now particularly to Figure 2, the various curves shown in that figure represent the wave forms of the signals appearing at different portions of the cycling mechanism. The wave form of curve B represents the signal appearing at the output terminal of binary counter 26 connected to deflection electrode 40, while the signal of curve C appears at the output terminal connected to deflection electrode 41. Similarly, the signal of curve E appears at the output circuit of binary counter 27 connected to deflection electrode 48, and the wave form of curve F appears at the output terminal connected to deflection element 49. The signal of curve D appears at the output circuit of blocking oscillator 28, and because of the 3:1 frequency division effected by that oscillator, only every 3rd pulse of curve A (which is the input signal applied to oscillator 28) is translated to binary counter 27.

From an analysis of the family of curves, it is apparent that the signals of curves B and C, as well as the signals of curves E and F, are 180° out of phase. It is further to be noted, from examining the extreme left-hand portion of the curves, that there is a relatively positive potential on deflection electrode 40 with respect to the potential impressed on deflection electrode 41 while there is a relatively negative potential on deflection electrode 48 with respect to the potential on deflection electrode 49. Thus, before the receipt of the first pulse of curve A, the electron beam of tube 67 is directed to target electrode 38 and the beam of tube 68 is collected by target electrode 47. The video signal is therefore channelled at this time from video amplifier 11 to mixer amplifier 13 via delay line 37. This delay line introduces a time delay of duration ⅓$\Delta t$ and thus the transmitter is established in operating mode *"b."* The corresponding mode changing diagram has been shown on the bottom of Figure 2 to further illustrate the effect of the cycling feature of the encoding system in producing mode changes at a faster-than-field rate and in a regular repeating fashion. The mode changing pattern is of stair-step waveform, and the operating mode of the transmitter before the receipt of the first pulse of curve A, normally mode *"b,"* corresponds to the first "step."

In response to the first pulse of curve A, binary counter 26 operates to reverse the relative potentials at its two output terminals thereby to switch the electron beam of tube 67 over to target electrode 39. Delay line 37 is therefore no longer functionally included in the video channel and consequently the transmitter is established in mode *"a,"* the mode in which there is no appreciable time delay between the video and synchronizing components. Encoding device 12 remains in that mode for the time duration represented by the period of the pulse signal of curve A, which in the illustrated embodiment may be equivalent to the time duration of either 4 line traces or 16 line traces. The second pulse of curve A triggers counter 26 back to its initial operating condition so that once again the system is established in mode *"b."*

However, in response to the application of the third input pulse to the cycling mechanism not only does counter 26 assume its opposite condition which effectively removes delay line 37 from the video circuit, but binary counter 27 receives a pulse from 3:1 blocking oscillator 28 to effect actuation of that counter to its alternate condition. The potential of deflection element 48 is now positive with respect to the potential impressed on deflection element 49 and thus the beam of tube 68 is switched to target electrode 46 thereby to functionally include delay line 45 in the video channel. Since this line exhibits a delay of ⅔$\Delta t$, the system is established in mode *"c,"* as represented by the corresponding interval of the mode-changing pattern. Finally, in response to the fourth input pulse, binary counter 26 assumes its alternate condition effectively to switch the beam of tube 67 back to target electrode 38. Both delay line 37 and delay line 45 are now interposed in the video channel so that the maximum time delay $\Delta t$ is introduced between the video and synchronizing components to establish the system in mode *"d"* operation, as illustrated in the mode-changing pattern.

Responsive to the succeeding or fifth pulse of curve A, counter 26 operates to remove delay line 37 from the video channel to cause the system to assume mode *"c"* operation, and in response to the sixth input pulse, counter 27 operates to remove delay line 45 from the video circuit while counter 26 is actuated to re-insert delay line 37 into the video channel. The system is once again established in mode *"b"* and at a "step" corresponding to that assumed before the application of the first input pulse. Pulse-actuated cycling mechanism 25 operates continuously as described, thereby to effect cyclic mode changes in the television system between four operating modes and at a faster-than-field rate.

In short, the cycling mechanism operates in response to the application of a predetermined number of pulses (6 in the illustrated embodiment) for advancing from one to another of at least four operating steps in executing each cycle of operation. The deflection-control signals applied to the encoding device from the cycling mechanism effect actuation of the coder from one to another of its operating conditions as mechanism 25 advances from one to another of its operating steps.

As presently to be described, the encoding system of each authorized receiver preferably includes corresponding binary counters and blocking oscillators as employed at the transmitter in order to develop the proper decoding signals to unscramble the coded television signal. It is possible that such circuits at some of the subscriber receivers may fall out of step with the corresponding circuitry at the transmitter, even when supplied with the appropriate key signal, due to noise or other extraneous signals. To remedy this condition, a reset circuit may be provided to operate occasionally or at frame intervals during a subscription telecast to translate a signal to the binaries and the blocking oscillators at the transmitter and to control the application of a corresponding signal to the binaries and blocking oscillators at the various authorized receivers for resetting or "locking in" all such circuits for synchronous operation. However, such a technique forms no part of the present invention and thus it has been omitted in order to avoid unnecessarily encumbering the drawing.

It might be stated at this point that if the encoding system is reset to a reference condition at the beginning of each frame interval, as disclosed in copending application Serial No. 291,714, the pattern resulting at the image reproducer of an unauthorized receiver "stands still" as far as vertical motion is concerned whereas if the encoding system is allowed to run continuously for a number of frame intervals before resetting, the picture gives the appearance or illusion of "walking" or "rolling" toward the top or bottom of the picture tube. This effect obtains since an encoding arrangement which produces mode changes upon the completion of a sequence of operating steps, when the number of operating steps is not an even sub-multiple of the number of line intervals per frame, assumes different operating conditions at the beginning of succeeding frames so that mode changes do not occur at corresponding line traces of successive frames. Such a coding technique is described and claimed in copending application Serial No. 344,996.

This "walking" effect is achieved in the system described in the present application so long as resetting is not accomplished as often as once per frame interval, since cycling mechanism 25 requires 24 line-trace intervals to execute one complete cycle of operation when the signal produced by 4:1 blocking oscillator 32 is effective whereas the cycling mechanism requires 96 line traces to execute a cycle when the pulse signal produced in 16:1 blocking oscillator 33 is supplied to the mechanism. In either case, the number of line traces required is not integrally related to the number of line traces in a frame interval (namely 525 under United States standards) and thus the cycling mechanism does not assume the same step at the beginning of each successive frame.

Figure 3:
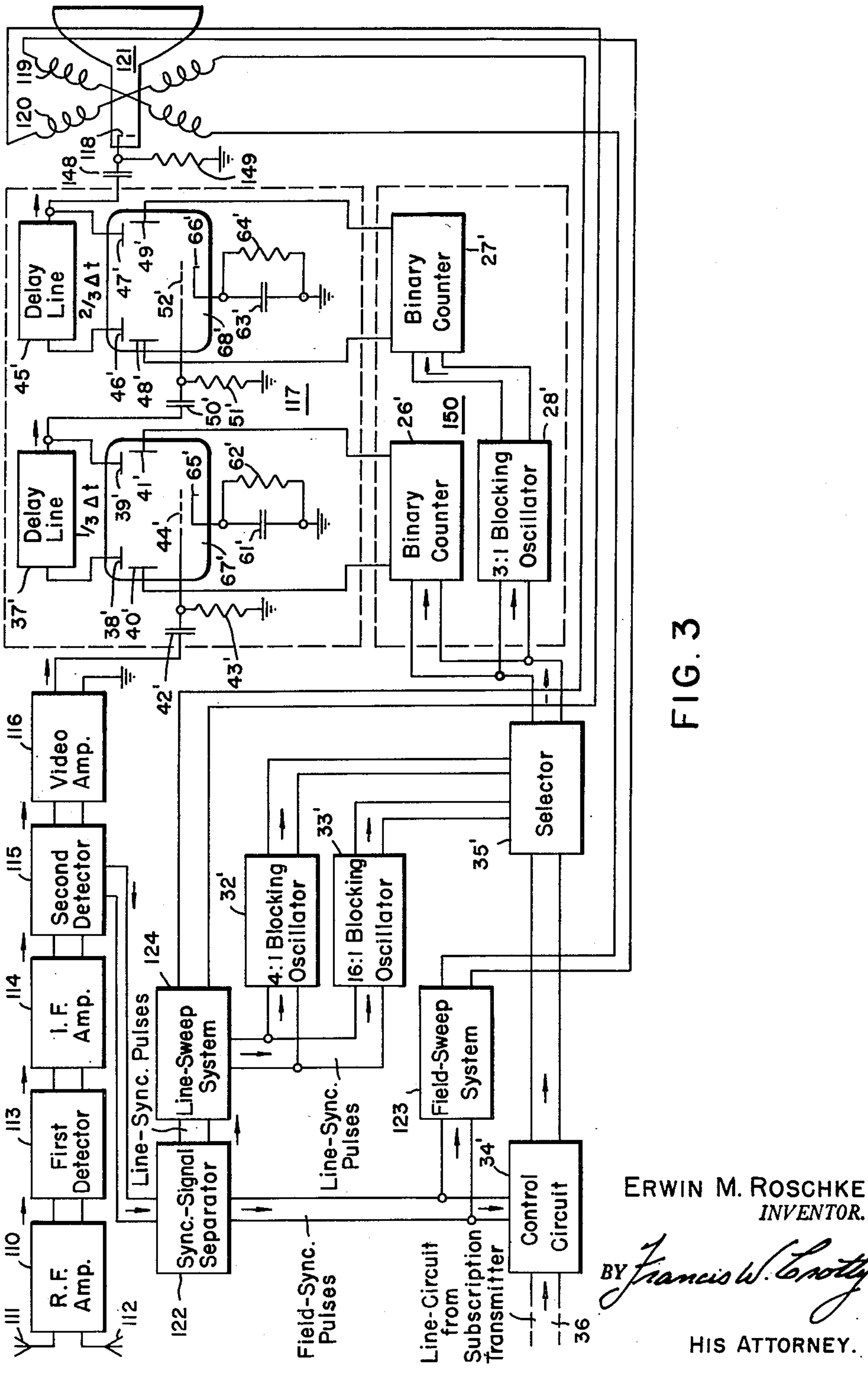
Figure 3 represents a subscription television receiver constructed in accordance with the invention for operation in conjunction with the transmitter of Figure 1.

The receiver of Figure 3, which may utilize the subscription telecast from the transmitter of Figure 1, includes a radio-frequency amplifier 110 having input terminals connected to an antenna circuit 111, 112 and output terminals connected to a first detector 113. The first detector is connected through an intermediate-frequency amplifier 114 to a second detector 115 which, in turn, is connected to a video amplifier 116. The video amplifier is coupled through an encoding device or decoder 117 and a condenser 148 to the input electrode 118 of a cathode-ray image-reproducing device 121. Input electrode 118 is also connected to ground through a grid-leak resistor 149. Decoder 117 may be constructed in a similar manner as coder 12 at the transmitter, as indicated by the primed reference numerals applied to corresponding elements, with the exception that it is controlled to operate in complementary fashion in order effectively to compensate for the variations in the timing of the received television signal. More particularly, when coder 12 imparts a delay of $\Delta t$ to the video components, decoder 117 translates the video signal to the image reproducer with no appreciable time delay. Similarly, when encoding device 12 is in the "zero delay" condition, decoder 117 is in the "$\Delta t$ delay" condition; when coder 12 is in the "⅓$\Delta t$ delay" condition, decoder 117 is in the "⅔$\Delta t$ delay" condition; and finally, when unit 12 is in the "$\frac{2}{3}\Delta t$ delay" condition, decoding device 117 is in the "$\frac{1}{3}\Delta t$ delay" condition.

Second detector 115 is also coupled through a synchronizing-signal separator 122 to a field-sweep system 123 and to a line-sweep system 124. The output terminals of sweep systems 123 and 124 are connected respectively to field-deflection elements 119 and line-deflection elements 120, associated with reproducing device 121. Line-synchronizing pulses are also supplied to a 4:1 blocking oscillator 32' and to a 16:1 blocking oscillator 33' which are individually connected to separate input circuits of a selector 35'. The selector has input terminals connected to a control circuit 34' and output terminals connected to the input circuit of a pulse-actuated cycling mechanism 150. Control circuit 34' has one pair of input terminals connected to separator 122 to derive field-synchronizing pulses therefrom and another pair of input terminals connected to line circuit 36. Circuits 32', 33', 34' and 35' are constructed and operate in the same manner as corresponding circuits 32, 33, 34 and 35, respectively, to develop a pulse signal corresponding to the pulse signal produced at the transmitter, for application to cycling mechanism 150.

This mechanism is also constructed in the same manner as its counterpart cycling mechanism 25 at the transmitter, as indicated by the primed numerals of the two binary counters and the 3:1 blocking oscillator. The binaries are connected to the deflection elements of decoder 117 but in a reverse sense as regards the corresponding connections at the transmitter in order to realize the compensating characteristic of the decoding system.

In the operation of the receiver of Figure 3, the coded television signal from the transmitter of Figure 1 is intercepted by antenna circuit 111, 112, amplified by radio-frequency amplifier 110 and heterodyned to the selected intermediate-frequency of the receiver in first detector 113. The resulting intermediate-frequency signal is amplified in intermediate-frequency amplifier 114 and detected in second detector 115 to produce a composite video signal. This latter signal is amplified in video amplifier 116 and translated through decoder 117 to the input electrode 118 of image-reproducing device 121 to control the intensity of the cathode-ray beam of the device in well-known manner.

Certain features described in the present application are disclosed and claimed in one or more of the following copending applications: Serial No. 310,309, filed September 18, 1952, in the name of Alexander Ellett; Serial No. 254,099, filed October 31, 1951, in the name of Alexander Ellett; Serial No. 370,174, filed July 24, 1953, in the name of Walter S. Druz; and Serial No. 374,716, filed August 17, 1953, in the name of Erwin M. Roschke, all of which are assigned to the present assignee, in addition to those copending applications previously mentioned.

The synchronizing components are separated in separator 122, the field-synchronizing components being utilized to synchronize sweep system 123 and, hence, the field scansion of image reproducer 121, whereas the line-synchronizing components are utilized to synchronize sweep system 124 and, therefore, the line scansion of device 121. Of course, the sound-modulated carrier received along with the video carrier is translated in the usual way through an audio system which has been omitted from the drawings for purposes of simplicity.

The key signal is received over line circuit 36 and causes operation of control circuit 34' in substantial time coincidence with corresponding circuit 34 at the transmitter. A selecting signal is thus developed for controlling the operation of selector 35' in synchronism with the operation of unit 35 at the transmitter to selectively apply the pulse signals produced in blocking oscillators 32' and 33' to pulse-actuated cycling mechanism 150 for operating that mechanism in the same manner as the operation of corresponding mechanism 25 at the transmitter, except in a complementary fashion, so that decoder 117 is actuated at the appropriate times to effect intelligible image reproduction.

This invention provides, therefore, an improved subscription television system in which the subscription television signal is encoded with a high degree of complexity. In the system of this invention, the mode of the subscription television signal may be varied at a faster-than-field rate between at least four modes in a repeating predetermined sequence to thoroughly scramble the image reproduced by unauthorized receivers.

While a particular embodiment of the invention has been shown and described, modifications may be made, and it is intended in the appended claims to cover all such modifications as may fall within the true spirit and scope of the invention.

I claim:

1. An encoding system for encoding a subscription television signal having video components included within a recurring series of line-trace intervals constituting successive image fields and further having intervening line-synchronizing components, said system comprising: an encoding device having at least four operating conditions each of which establishes a different time relation between said video and synchronizing components of said television signal; a pulse-signal source for developing pulses recurring at a rate greater than the recurrence rate of said image fields and individually representing one of said line intervals; a pulse-actuated cycling mechanism having an input circuit coupled to said pulse-signal source and responsive to the application of a predetermined number of pulses from said source for advancing from one to another of at least four operating steps in executing each cycle of operation and including first counting means, second counting means, and third counting means for effecting actuation of said second counting means at a frequency less than and sub-harmonically related to the frequency of said first counting means; and means for coupling said cycling mechanism to said encoding device to actuate said device from one to another of its operating conditions as said mechanism advances from one to another of its operating steps.

2. An encoding system for encoding a subscription television signal having video components included within a recurring series of line-trace intervals constituting successive image fields and further having intervening line-synchronizing components, said system comprising: an encoding device having at least four operating conditions each of which establishes a different time relation between said video and synchronizing components of said television signal; a pulse-signal source for developing pulses recurring at a rate greater than the recurrence rate of said image fields and individually representing one of said line intervals; a pulse-actuated cycling mechanism having an input circuit coupled to said pulse-signal source and responsive to the application of a predetermined number of pulses from said source for advancing from one to another of at least four operating steps in executing each cycle of operation and including first counting means coupled to said input circuit, second counting means, and third counting means coupled between said input circuit and said second counting means for effecting actuation of said second counting means at a frequency less than and sub-harmonically related to the frequency of said first counting means; and means for coupling said cycling mechanism to said encoding device to actuate said device from one to another of its operating conditions as said mechanism advances from one to another of its operating steps.

3. An encoding system for encoding a subscription television signal having video components included within a recurring series of line-trace intervals constituting successive image fields and further having intervening line-synchronizing components, said system comprising: an encoding device having at least four operating conditions each of which establishes a different time relation between said video and synchronizing components of said television signal; a pulse-signal source for developing pulses recurring at a rate greater than the recurrence rate of said image fields and individually representing one of said line intervals; a pulse-actuated cycling mechanism having an input circuit coupled to said pulse-signal source and responsive to the application of a predetermined number of pulses from said source for advancing from one to another of at least four operating steps in executing each cycle of operation and including first counting means coupled to said input circuit, second counting means, and third counting means including a 3-to-1 frequency divider coupled between said input circuit and said second counting means for effecting actuation of said second counting means at a frequency $\frac{1}{3}$ the frequency of said first counting means; and means for coupling said cycling mechanism to said encoding device to actuate said device from one to another of its operating conditions as said mechanism advances from one to another of its operating steps.

4. An encoding system for encoding a subscription television signal having video components included within a recurring series of line-trace intervals constituting successive image fields and further having intervening line-synchronizing components, said system comprising: an encoding device having at least four operating conditions each of which establishes a different time relation between said video and synchronizing components of said television signal; a pulse-signal source for developing pulses recurring at a rate greater than the recurrence rate of said image fields and individually representing one of said line intervals; a pulse-actuated cycling mechanism having an input circuit coupled to said pulse-signal source and responsive to the application of a predetermined number of pulses from said source for advancing from one to another of at least four operating steps in executing each cycle of operation and including a first binary counter coupled to said input circuit, a second binary counter, and counting means coupled between said input circuit and said second binary counter for effecting actuation of said second binary counter a a frequency less than and sub-harmonically related to the frequency of said first binary counter; and means for coupling said cycling mechanism to said encoding device to actuate said device from one to another of its operating conditions as said mechanism advances from one to another of its operating steps.

5. An encoding system for encoding a subscription television signal having video components included within a recurring series of line-trace intervals constituting successive image fields and further having intervening line-synchronizing components, said system comprising: an encoding device having four operating conditions each of which establishes a different time relation between the video and synchronizing components of said signal; a first binary counter coupled to said encoding device and operable responsive to a predetermined number of input pulses for actuating said device as between its first and second operating conditions; a second binary counter coupled to said encoding device and operable responsive to a predetermined number of input pulses for actuating, in conjunction with said first binary counter, said device as between its third and fourth operating conditions; a pulse-signal source for supplying a series of pulses to said first binary counter; and means including a frequency divider coupled to said pulse-signal source for supplying a series of pulses to said second binary counter, the timing relation between the pulses supplied to the first binary counter and the pulses supplied to the second binary counter being such that said encoding device advances from one operating condition to the next in a predetermined sequence to effect cyclic mode changes of said television signal.

6. In a television system for translating a television signal having a recurring series of line-trace intervals constituting successive time intervals $t_1$, an encoding arrangement comprising: an encoding device having at least four operating conditions each of which introduces a different time relation between said video and synchronizing components of said television signal; a cycling mechanism for advancing after each time interval $t_2$, where interval $t_2$ is less than time interval $t_1$, from one to another of at least four operating steps in executing each cycle of operation and including first control means, second control means, and third control means for effecting actuation of said second control means at a frequency less than and sub-harmonically related to the frequency of said first control means; means for effecting actuation of said cycling mechanism from one operating step to the next; and means for coupling said cycling mechanism to said encoding device to actuate said device from one to another of its operating conditions as said mechanism advances from one to another of its operating steps.

References Cited in the file of this patent

UNITED STATES PATENTS

| Number | Name | Date |
|---|---|---|
| 2,510,046 | Ellett et al. | May 30, 1950 |
| 2,547,598 | Roschke | Apr. 5, 1951 |
| 2,656,407 | Herrick et al. | Oct. 20, 1953 |
| 2,656,410 | Herrick et al. | Oct. 20, 1953 |